US011941890B2

(12) United States Patent
Maeda et al.

(10) Patent No.: US 11,941,890 B2
(45) Date of Patent: Mar. 26, 2024

(54) SIDEWALK INFORMATION GENERATION DEVICE, METHOD AND PROGRAM

(71) Applicant: NIPPON TELEGRAPH AND TELEPHONE CORPORATION, Tokyo (JP)

(72) Inventors: Atsuhiko Maeda, Musashino (JP); Manabu Yoshida, Musashino (JP); Yuki Yokohata, Musashino (JP); Ippei Shake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 672 days.

(21) Appl. No.: 15/734,588

(22) PCT Filed: May 30, 2019

(86) PCT No.: PCT/JP2019/021500
§ 371 (c)(1),
(2) Date: Dec. 3, 2020

(87) PCT Pub. No.: WO2019/235348
PCT Pub. Date: Dec. 12, 2019

(65) Prior Publication Data
US 2021/0232831 A1 Jul. 29, 2021

(30) Foreign Application Priority Data

Jun. 4, 2018 (JP) ................. 2018-107111

(51) Int. Cl.
*G06T 11/20* (2006.01)
*G06T 7/13* (2017.01)
(Continued)

(52) U.S. Cl.
CPC .............. *G06V 20/588* (2022.01); *G06T 7/13* (2017.01); *G06T 11/20* (2013.01); *G06T 11/60* (2013.01); *G06V 2201/07* (2022.01)

(58) Field of Classification Search
CPC ........... G06T 7/13; G06T 11/20; G06T 11/60; G06V 20/588
See application file for complete search history.

(56) References Cited

FOREIGN PATENT DOCUMENTS

JP H04141783 A 5/1992

OTHER PUBLICATIONS

T. Y. Zhang and Ching Y Suen., A Fast Parallel Algorithms forThinning Digital Patterns, Communication of the ACM, vol. 27, No. 3, 1984, pp. 236-239.

(Continued)

*Primary Examiner* — Sam Bhattacharya
(74) *Attorney, Agent, or Firm* — Harness, Dickey & Pierce, P.L.C.

(57) ABSTRACT

A sidewalk information generation device includes a thinning unit configured to perform thinning processing for extracting, from image data indicating an area of a sidewalk, a centerline in a width direction of the area of the sidewalk, a segmentation unit configured to perform segmentation processing for dividing the centerline extracted by the thinning unit in a longitudinal direction to generate a plurality of lines, and a vectorization unit configured to convert each of the plurality of lines generated by the segmentation unit to vector data indicating a coordinate sequence of a plurality of line segments.

10 Claims, 22 Drawing Sheets

(51) Int. Cl.
*G06T 11/60* (2006.01)
*G06V 20/56* (2022.01)

(56) References Cited

OTHER PUBLICATIONS

Ryo Taniguchi et al., Construction of Sidewalk Network Data considering Movement Support for Visually Impaired Persons, Papers and Proceedings of the Geographic Information Systems Association of Japan, vol. 25, 2016, pp. 1-4.

| |
|---|
| 139.702496332,35.692694242 |
| 139.702514681,35.692848653 |
| 139.702423839,35.692691208 |
| 139.7024194,35.692725111 |
| 139.702508028,35.692885469 |
| 139.702531964,35.692890611 |
| 139.702601317,35.692861367 |
| 139.702588426,35.692848539 |
| 139.702496333,35.692694242 |

Fig. 2

| |
|---|
| 139.702718294,35.693145383 |
| 139.703144386,35.693029408 |
| 139.703168153,35.693006897 |
| 139.703175119,35.692988164 |
| 139.703169403,35.692964761 |
| 139.703026408,35.692738486 |
| 139.703015472,35.692737 |
| 139.703002317,35.692739875 |
| 139.703127314,35.692938808 |
| 139.703126081,35.692940761 |
| 139.703111047,35.692979789 |
| 139.702800761,35.693062831 |
| 139.702697411,35.69302835 |
| 139.702617111,35.692895175 |
| 139.702555492,35.692924092 |
| 139.702546536,35.692945808 |
| 139.70264035,35.693099731 |
| 139.702667661,35.693128275 |
| 139.702718294,35.693145383 |

Fig. 3

| road_id | seg_id | point_id | latitude | longitude | width |
|---|---|---|---|---|---|
| 8670 | 0 | 0 | 35.69272174 | 139.7024688 | 685.8085485 |
| 8670 | 0 | 1 | 35.69268027 | 139.702488 | 265.0115642 |
| 8670 | 0 | 2 | 35.69264866 | 139.7025144 | 3.616915367 |
| 8670 | 1 | 0 | 35.69271315 | 139.7024444 | 419.7898651 |
| 8670 | 1 | 1 | 35.69272174 | 139.7024688 | 685.8085485 |
| 8670 | 2 | 0 | 35.6928604 | 139.7025268 | 423.1365893 |
| 8670 | 2 | 1 | 35.69284102 | 139.7025332 | 684.1613165 |
| 8670 | 3 | 0 | 35.69286114 | 139.702601 | 2.557545383 |
| 8670 | 3 | 1 | 35.69285746 | 139.7025806 | 176.3778424 |
| 8670 | 3 | 2 | 35.69284102 | 139.7025332 | 684.1613165 |
| 8670 | 4 | 0 | 35.69272174 | 139.7024688 | 685.8085485 |
| 8670 | 4 | 1 | 35.6927296 | 139.7024704 | 727.1821613 |
| 8670 | 4 | 2 | 35.69284102 | 139.7025332 | 684.1613165 |

Fig. 19

| road_id | seg_id | point_id | latitude | longitude | width |
|---|---|---|---|---|---|
| 8958 | 0 | 0 | 35.69273996 | 139.7030031 | 5.716845332 |
| 8958 | 0 | 1 | 35.69274511 | 139.7030161 | 119.2582071 |
| 8958 | 0 | 2 | 35.69274707 | 139.7030193 | 141.3492191 |
| 8958 | 0 | 3 | 35.69292968 | 139.7031343 | 183.0387899 |
| 8958 | 0 | 4 | 35.69295422 | 139.7031399 | 313.2601609 |
| 8958 | 0 | 5 | 35.69298343 | 139.7031419 | 529.7577295 |
| 8958 | 0 | 6 | 35.6930011 | 139.7031305 | 462.1485215 |
| 8958 | 0 | 7 | 35.69300257 | 139.7031293 | 445.6334771 |
| 8958 | 0 | 8 | 35.69300502 | 139.7031249 | 427.7298723 |
| 8958 | 0 | 9 | 35.69308875 | 139.7028219 | 430.2837335 |
| 8958 | 0 | 10 | 35.6930024 | 139.7027763 | 534.4872132 |
| 8958 | 0 | 11 | 35.69309142 | 139.7027219 | 761.8266174 |
| 8958 | 0 | 12 | 35.69308454 | 139.7027021 | 778.7925169 |
| 8958 | 0 | 13 | 35.69306393 | 139.7026691 | 733.5497613 |
| 8958 | 0 | 14 | 35.69295275 | 139.7026013 | 692.570823 |
| 8958 | 0 | 15 | 35.69295152 | 139.7025999 | 666.8968187 |
| 8958 | 0 | 16 | 35.69294218 | 139.7025709 | 351.2739937 |

Fig. 20

| road_id | seg_id | part_id | latlon_id | latitude | longitude | width |
|---|---|---|---|---|---|---|
| 8670 | 0 | 0 | 35.69288104780028_139.70255576480175 | 35.69288105 | 139.70255558 | 684.1613165 |
| 8670 | 0 | 1 | 35.69288735270562_139.70244658831396 | 35.68268735 | 139.7024466 | 727.1921613 |

Fig. 27

| road_id | seg_id | point_id | latlon_id | latitude | longitude | width |
|---|---|---|---|---|---|---|
| 8958 | 0 | 0 | 35.69273382239671_139.70301101737735 | 35.69273392 | 139.703011 | 141.3492191 |
| 8958 | 0 | 1 | 35.6929296760216335_139.7031343 | 35.69282968 | 139.7031343 | 1830.387899 |
| 8958 | 0 | 2 | 35.6929542142908685_139.7031399 | 35.69295422 | 139.7031399 | 313.2601609 |
| 8958 | 0 | 3 | 35.6929834257612535_139.7031419 | 35.69298343 | 139.7031419 | 529.7577295 |
| 8958 | 0 | 4 | 35.693001036935095_139.7031305 | 35.6930011 | 139.7031305 | 462.1485215 |
| 8958 | 0 | 5 | 35.6930025685312535_139.7031293 | 35.69300257 | 139.7031293 | 445.6334771 |
| 8958 | 0 | 6 | 35.693005022858175_139.7031249 | 35.69300502 | 139.7031249 | 427.7298723 |
| 8958 | 0 | 7 | 35.693008673294471635_139.7028219 | 35.69308675 | 139.7028219 | 430.2837338 |
| 8958 | 0 | 8 | 35.693092397809863535_139.7027763 | 35.69309240 | 139.7027763 | 534.4872132 |
| 8958 | 0 | 9 | 35.6930914181635635_139.7027219 | 35.69309142 | 139.7027219 | 761.8260174 |
| 8958 | 0 | 10 | 35.69308454464049_139.7027021 | 35.69308454 | 139.7027021 | 778.7925169 |
| 8958 | 0 | 11 | 35.6930638277043335_139.7026691 | 35.69306393 | 139.7026691 | 733.5487613 |
| 8958 | 0 | 12 | 35.6929348577239235_139.70253008611063 | 35.69293438 | 139.7025901 | 892.5708223 |

Fig. 30

SIDEWALK INFORMATION GENERATION DEVICE, METHOD AND PROGRAM

CROSS-REFERENCE TO RELATED APPLICATIONS

This application is a 371 U.S. National Phase of International Application No. PCT/JP2019/021500, filed on May 30, 2019, which claims priority to Japanese Application No. 2018-107111 filed on Jun. 4, 2018. The entire disclosures of the above applications are incorporated herein by reference.

TECHNICAL FIELD

Embodiments of the present invention relate to a sidewalk information generation device, method, and program.

BACKGROUND ART

Road network information with attribute information is essential in order to construct a system that performs road guidance for vehicles or people. The road network information is information in which a road network is represented by nodes and links. The system that performs the road guidance searches for the road network information and presents an optimal path to a user. Further, when various types of attribute information such as road width and one-way traffic constraints are included in the road network information, the system that performs the road guidance can search for an optimal path in consideration of the road network information.

In recent years, there has been an increasing need for sidewalk network information in which places serving as barriers are described for disabled people. For example, wheelchair users cannot pass through a sidewalk that does not have a width equal to or greater than a width of a wheelchair. Thus, it is preferable to collect information on a centerline of a sidewalk and a width of the sidewalk in order to achieve a system that performs road guidance for disabled people and wheelchair users. When there is the information on the centerline of the sidewalk and the width of the sidewalk, it is possible to create sidewalk network information in which sidewalks are connected.

Creation of data regarding the centerline of the sidewalk and the width of the sidewalk through local research or manual work requires a significant amount of cost. However, in general, there is electronic map data including sidewalk polygon data (sometimes referred to simply as polygon data) in which an area of a sidewalk is converted to two-dimensional polygons. Thus, automatically extracting a centerline of a sidewalk from the electronic map data to contribute to automatic generation of road information is conceivable. Here, a key technology is image processing called so-called "thinning" for obtaining a centerline forming a shape having an area. A representative scheme of this processing is disclosed in, for example, Non Patent Literature 1.

CITATION LIST

Non Patent Literature

Non Patent Literature 1: Zhang, T. Y. and Suen, Ching Y., "A Fast Parallel Algorithms For Thinning Digital Patterns," Communication of the ACM, Vol 27, No. 3, Maret 1984, pp. 236-239.

SUMMARY OF THE INVENTION

Technical Problem

However, a portion of an end of a sidewalk area is in a curved shape. Thus, when a sidewalk area is mechanically thinned as it is, an end of a sidewalk centerline is also in a curved shape. When such lines are connected to create sidewalk network information, smooth road guidance is not achieved. Thus, this sidewalk network information is not preferable.

Further, with only the sidewalk polygon data subjected to thinning processing, unnecessary line segments may be generated regardless of what thinning algorithm is used, which hinders creation of correct sidewalk network information.

The curved shape of the sidewalk centerline and extra line segments need to be corrected through separate processing, but a result of performing thinning processing on sidewalk polygon data described above is not suitable for direct use in correction.

The present invention has been made with reference to the above circumstances, and an object of the present invention is to provide a sidewalk information generation device, method, and program capable of appropriately generating sidewalk information for road guidance.

Means for Solving the Problem

To achieve the above object, a first aspect of a sidewalk information generation device according to an embodiment of the present invention is a sidewalk information generation device including: a thinning unit configured to perform thinning processing for extracting, from image data indicating an area of a sidewalk, a centerline in a width direction of the area of the sidewalk; a segmentation unit configured to perform segmentation processing for dividing the centerline extracted by the thinning unit in a longitudinal direction to generate a plurality of lines; and a vectorization unit configured to convert each of the plurality of lines generated by the segmentation unit to vector data indicating a coordinate sequence of a plurality of line segments.

A second aspect of the sidewalk information generation device according to the present invention is the sidewalk information generation device according to the first aspect, further including a width calculation unit configured to calculate a width of the sidewalk based on a distance between a predetermined position indicated by the coordinate sequence of the plurality of line segments indicated by the vector data converted by the vectorization unit and a boundary of the area of the sidewalk.

A third aspect of the sidewalk information generation device of the present invention is the sidewalk information generation device according to the first aspect, further includes a deletion unit configured to extract the plurality of line segments extending from a branch point of coordinate, each of the plurality of line segments having one end as the branch point, from among the plurality of line segments indicated as the coordinate sequence by the vector data, leave one of the plurality of line segments that is extracted, and then delete some of the plurality of line segments, each of which is different from the one of the plurality of line segments and has a length smaller than a predetermined length among the plurality of line segments that are extracted.

A fourth aspect of the sidewalk information generation device of the present invention is the sidewalk information generation device according to the second aspect, further including a deletion unit configured to extract the plurality of line segments extending from a branch point of coordinate, each of the plurality of line segments having one end as the branch point, from among the plurality of line segments indicated as the coordinate sequence by the vector data, leave one of the plurality of line segments that is extracted, and then delete some of the plurality of line segments, each of which is different from the one of the plurality of line segments and has a length smaller than a predetermined length among the plurality of line segments that are extracted.

A fifth aspect of the sidewalk information generation device according to the present invention is the sidewalk information generation device according to the first aspect, further including a correction unit configured to convert a line segment having warpage indicated by the vector data to a line segment serving as a reference and a line segment linearly connected to the line segment serving as the reference to correct the warpage.

A sixth aspect of the sidewalk information generation device according to the present invention is the sidewalk information generation device according to the second aspect, further including: a correction unit configured to convert a line segment having warpage indicated by the vector data to a line segment serving as a reference and a line segment linearly connected to the line segment serving as the reference to correct the warpage.

A seventh aspect of the sidewalk information generation device according to the present invention is the sidewalk information generation device according to the third aspect, further including: a correction unit configured to convert a line segment having warpage indicated by the vector data to a line segment serving as a reference and a line segment linearly connected to the line segment serving as the reference to correct the warpage.

An eighth aspect of the sidewalk information generation device according to the present invention is the sidewalk information generation device according to the fourth aspect, further including: a correction unit configured to convert a line segment having warpage indicated by the vector data to a line segment serving as a reference and a line segment linearly connected to the line segment serving as the reference to correct the warpage.

An aspect of a sidewalk information generation method performed by a sidewalk information generation device according to an embodiment of the present invention includes: performing thinning processing for extracting, from image data indicating an area of a sidewalk, a centerline in a width direction of the area of the sidewalk; performing segmentation processing for dividing the centerline that is extracted in a longitudinal direction to generate a plurality of lines; and converting each of the plurality of lines that is generated to vector data indicating a coordinate sequence of a plurality of line segments.

An aspect of a sidewalk information generation processing program according to an embodiment of the present invention causes a processor to operate as each of the unit of the sidewalk information generation device according to any one of the first to eighth aspects.

Effects of the Invention

With the first aspect of the sidewalk information generation device according to the embodiment of the present invention, the plurality of lines are generated by dividing the sidewalk centerline in the longitudinal direction and converted to the vector data indicating the coordinate sequence of line segments. Thus, it is possible to appropriately create sidewalk information that is effective for road guidance for pedestrians, particularly wheelchair users and the like.

With the second aspect of the sidewalk information generation device according to the embodiment of the present invention, the width of the sidewalk including a predetermined position of the vector data is calculated. Thus, it is possible to create sidewalk information that is effective for a determination as to whether pedestrians, particularly wheelchair users and the like, can pass.

With the third and fourth aspects of the sidewalk information generation device according to the embodiment of the present invention, unnecessary branches having a length equal to or smaller than the predetermined length among the branches at the sidewalk centerline are removed on the basis of the vector data. Thus, it is possible to create appropriate sidewalk information that can be used for smooth road guidance.

With the fifth to eighth aspects of the sidewalk information generation device according to the embodiment of the present invention, extra warpage of the sidewalk centerline is corrected on the basis of the vector data. Thus, it is possible to create appropriate sidewalk information that can be used for correct road guidance.

That is, according to the present invention, it is possible to appropriately generate sidewalk information for road guidance.

BRIEF DESCRIPTION OF DRAWINGS

FIG. 2 is a diagram illustrating a first example of sidewalk polygon data.

FIG. 3 is a diagram illustrating a second example of the sidewalk polygon data.

FIG. 19 is a diagram illustrating an example of output data of a width.

FIG. 20 is a diagram illustrating an example of output data of a width.

FIG. 27 is a diagram illustrating an example of output data after the warpage correction processing.

FIG. 30 is a diagram illustrating an example of output data after the warpage correction processing.

DESCRIPTION OF EMBODIMENTS

Hereinafter, one embodiment of the present invention will be described below with reference to the drawings.

Figure 1:
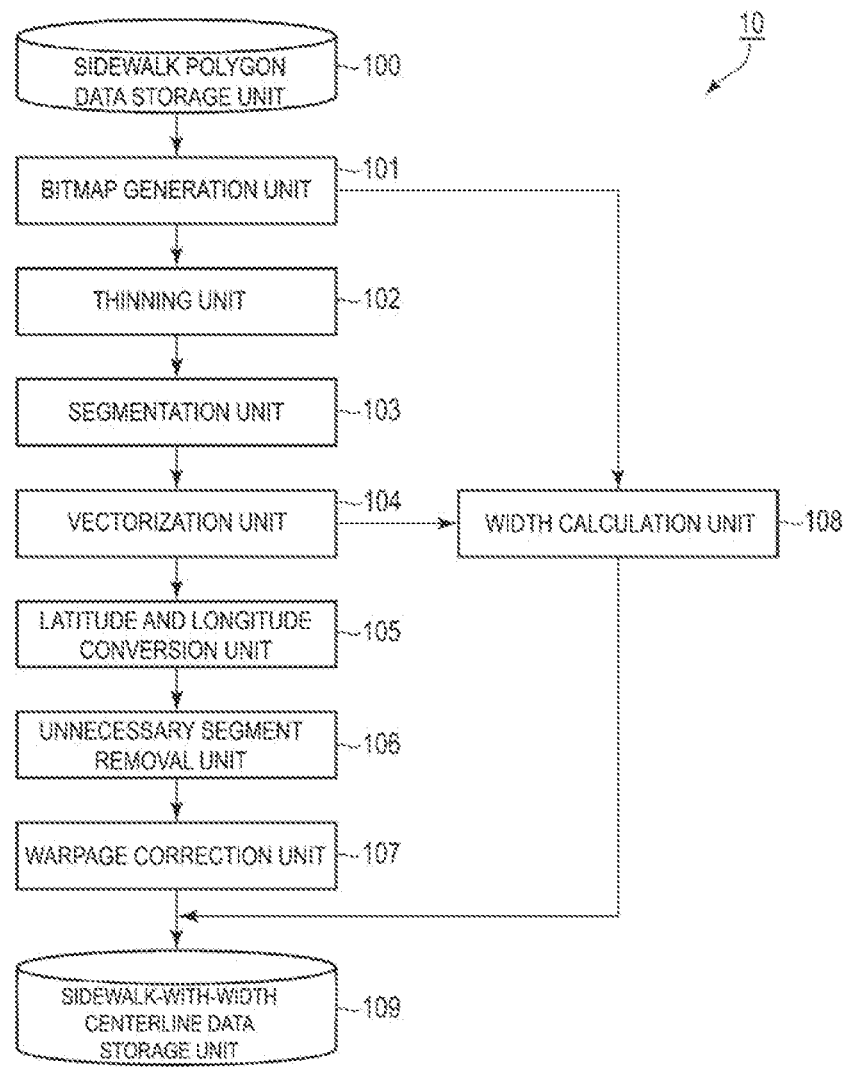
FIG. 1 is a diagram illustrating an application example of a sidewalk centerline generation device according to an embodiment of the present invention.

FIG. 1 is a diagram illustrating an application example of a sidewalk centerline generation device according to an embodiment of the present invention.

As illustrated in FIG. 1, a sidewalk centerline generation device (a sidewalk information generation device) 10 includes a sidewalk polygon data storage unit 100, a bitmap generation unit 101, a thinning unit 102, a segmentation unit 103, a vectorization unit 104, a latitude and longitude conversion unit 105, an unnecessary segment removal unit (a deletion unit) 106, a warpage correction unit 107, a width calculation unit 108, and a sidewalk-with-width centerline data storage unit 109. Details of each unit will be described below.

Further, the sidewalk centerline generation device 10 can be implemented by a system in which a computer device such as a personal computer (PC) is used. For example, the computer device includes a processor, such as a central processing unit (CPU), a memory connected to the processor, and an input and output interface. Among these, the memory is configured using a storage device having a storage medium such as a non-volatile memory on which writing and reading can be performed at any time.

Functions of the bitmap generation unit 101, the thinning unit 102, the segmentation unit 103, the vectorization unit 104, the latitude and longitude conversion unit 105, the unnecessary segment removal unit 106, the warpage correction unit 107, and the width calculation unit 108 are implemented, for example, by the processor reading and executing a program stored in the memory. Some or all of these functions may be implemented by a circuit such as an application specific integrated circuit (ASIC).

The sidewalk polygon data storage unit 100 and the sidewalk-with-width centerline data storage unit 109 are provided in the non-volatile memory, for example.

Many domestic companies that sell maps sell maps obtained by tracing a range in which there is a sidewalk from an aerial photograph and digitalizing the sidewalk as sidewalk polygon data. In the embodiment of the present invention, this sidewalk polygon data is used to create vector data indicating the sidewalk centerline.

FIGS. 2 and 3 are diagrams illustrating two different examples in the sidewalk polygon data.

As illustrated in FIGS. 2 and 3, the sidewalk polygon data is a list of latitudes (for example, 35.6931 . . . described in the first column of FIG. 3) and longitudes (for example, 139.7027 . . . described in the first column of FIG. 3). In this list, an area obtained by connecting the latitudes and longitudes in order in a row direction indicates the area of the sidewalk. Such sidewalk polygon data is stored in the sidewalk polygon data storage unit 100.

Figure 4:
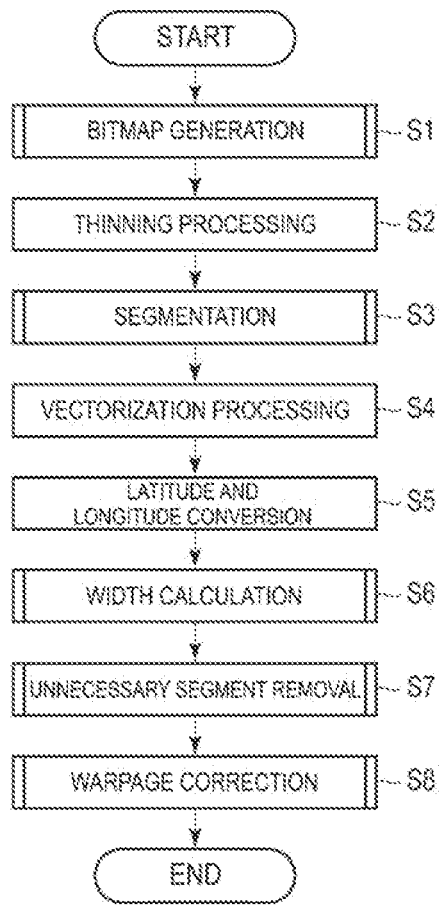
FIG. 4 is a flowchart illustrating an example of a processing procedure of a sidewalk centerline generation device according to an embodiment of the present invention.

Next, processing of the sidewalk centerline generation device 10 will be described. FIG. 4 is a flowchart illustrating an example of processing sequence of the sidewalk centerline generation device according to an embodiment of the present invention.

Generation of Bitmap

First, the bitmap generation unit 101 performs bitmap generation processing for converting the sidewalk polygon data into a bitmap (S1). The bitmap is also referred to as a sidewalk bitmap.

Figure 5:
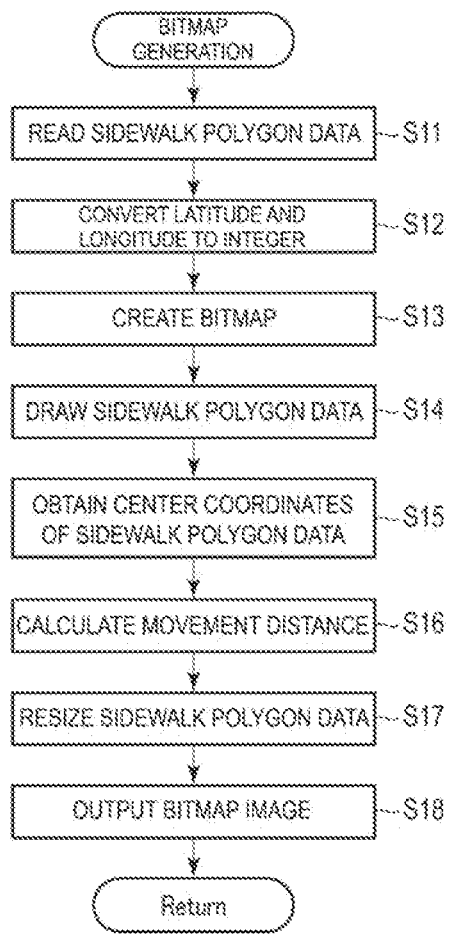
FIG. 5 is a flowchart illustrating an example of a procedure for bitmap generation processing in a sidewalk centerline generation device according to an embodiment of the present invention.

A specific example of the bitmap generation processing will be described in S11 to S18 below. FIG. 5 is a flowchart illustrating an example of a procedure for bitmap generation processing in the sidewalk centerline generation device according to an embodiment of the present invention.

First, the bitmap generation unit 101 reads the sidewalk polygon data from the sidewalk polygon data storage unit 100 (S11). In this bitmap generation processing, a length of a portion corresponding to one degree of latitude and longitude is considered to differ according to a region in which the sidewalk is located.

Further, because the latitude and longitude are expressed in decimal points, the bitmap generation unit 101 multiplies the latitude and longitude of the sidewalk polygon data by a sufficiently great value according to desired accuracy to convert the latitude and longitude to integers, before the bitmap generation unit 101 converts the sidewalk polygon data to the bitmap (S12).

In this example, the bitmap generation unit 101 obtains a value by multiplying the latitude and longitude of the sidewalk polygon data by 10000000 and truncates values after a decimal point from this value to convert the latitude and longitude to integers. The bitmap generation unit 101 converts a latitude "35.692694242" and a longitude "139.702499333" of a first row of the sidewalk polygon data illustrated in FIG. 2 to "356926942" and "1397024993," respectively.

The bitmap generation unit 101 creates the bitmap with a difference between a maximum value of the latitude and a minimum value of the latitude being a horizontal width and a difference between a maximum value of the longitude and a minimum value of the longitude being a vertical width in each row in which the sidewalk polygon data illustrated in FIG. 2 is formed (S13). The bitmap generation unit 101 draws the sidewalk polygon data in monochrome on the entire bitmap (S14). In the sidewalk polygon data illustrated in FIG. 2, the horizontal width is 1819 and the vertical width is 2420.

Then, the bitmap generation unit 101 obtains center coordinates of the sidewalk polygon data (S15).

The center coordinates consist of, for example, an average value of the latitude and an average value of the longitude of each row in which the sidewalk polygon data illustrated in FIG. 2 is formed.

For example, in the sidewalk polygon data illustrated in FIG. 2, the center coordinates (latitude, longitude) are (35.69277105, 139.7025096).

Then, the bitmap generation unit 101 calculates a movement distance mx of an x coordinate and a movement distance my of a y coordinate when a movement of a distance corresponding to one degree of latitude and longitude in the region in which the sidewalk is located is assumed, using Equations (1) and (2) below (S16).

$$mx = \text{equational\_radius} * \cos(\text{polygon\_center\_latitude} * PI/180) * PI/180 \quad \text{Equation (1)}$$

$$my = \text{polar\_radius} * PI/180 \quad \text{Equation (2)}$$

equational_radius in Equation (1) is 6378137 [m] of an equatorial radius, and polar_radius in Equation (2) is 6356752.314 [m] of a polar radius. polygon_center_latitude in Equation (1) is 35.69277105 in the sidewalk polygon data of FIG. 2. In this case, mx in Equation (1) is 90408.9198508 [m], and my in Equation (2) is 110946.257613 [m].

Next, the bitmap generation unit 101 multiplies a vertical width of the bitmap first created from the sidewalk polygon data by mx/my to resize the sidewalk polygon data (S17). As a result, the sidewalk polygon data illustrated in FIG. 2 is resized to a horizontal width of 1819 and a vertical width of 1972.

In this state, a certain portion of a sidewalk polygon comes in contact with an end of the bitmap, but the bitmap generation unit 101 provides a margin of one pixel around the sidewalk polygon for subsequent processing and outputs a bitmap image with a horizontal width of 1821 and a vertical width of 1974 (S18). Thereby, the processing of S1 ends.

Figure 6:
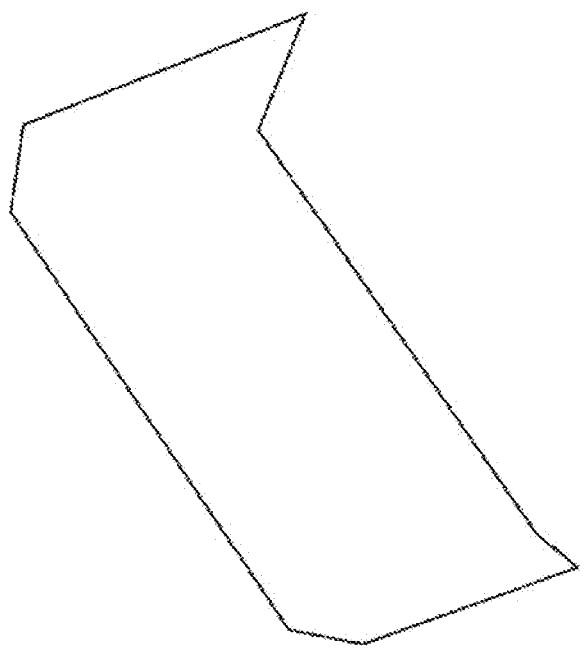
FIG. 6 is a diagram illustrating an example of a bitmap generated from the sidewalk polygon data.
Figure 7:
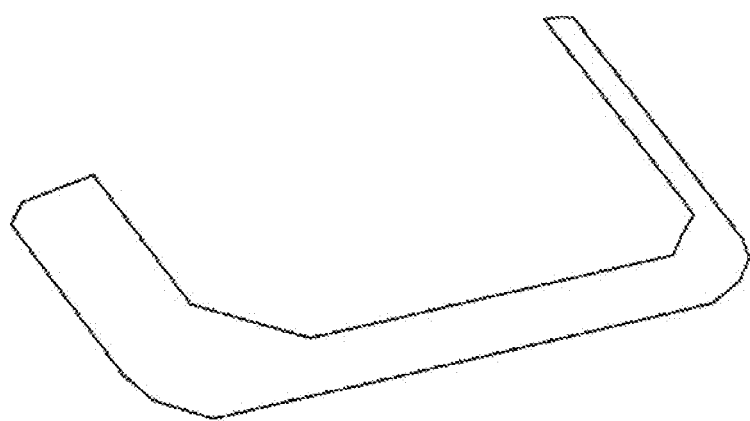
FIG. 7 is a diagram illustrating an example of a bitmap generated from the sidewalk polygon data.

FIGS. 6 and 7 are diagrams illustrating an example of a bitmap generated from the sidewalk polygon data.
An example in which the sidewalk polygon data illustrated in FIG. 2 is converted to a bitmap is illustrated in FIG. 6, and an example in which the sidewalk polygon data illustrated in FIG. 3 is converted to a bitmap is illustrated in FIG. 7.

Thinning of Sidewalk Bitmap
Then, the thinning unit 102 performs thinning processing for thinning the sidewalk bitmap using a so-called thinning algorithm (S2). Thinning is processing in which a centerline in a width direction of the area of the sidewalk is extracted from the area of the sidewalk. Various algorithms have been proposed for thinning, but here, a Zhang-Suen scheme disclosed in Non Patent Literature 1 described above is applied.

Specifically, the thinning unit 102 raster-scans the sidewalk bitmap generated in S1 and observes a pattern of 3×3 image values around a pixel of interest. When the pixel of interest satisfies Conditions (1), (2), and (3) below, the thinning unit 102 changes a value of the pixel of interest to a value of a white pixel.
 (1) The pixel of interest is a black pixel that is on a boundary.
 (2) Connectivity is preserved even when the pixel of interest is changed to a white pixel.
 (3) The pixel of interest is not an end point.

Figure 8:
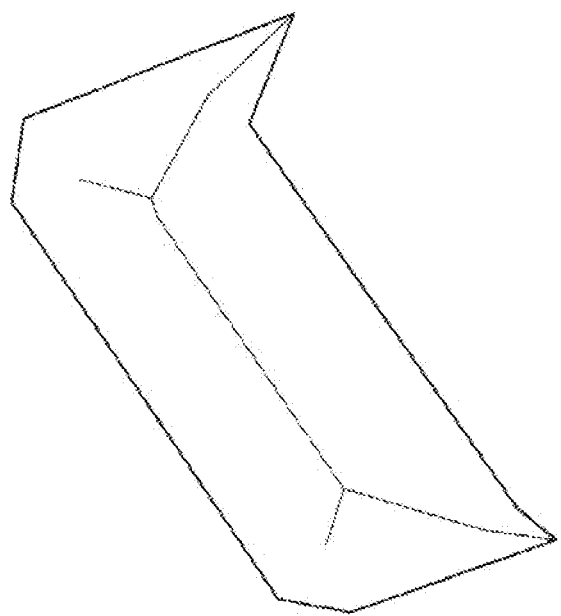
FIG. 8 is a diagram illustrating an example of a result of applying thinning processing.
Figure 9:
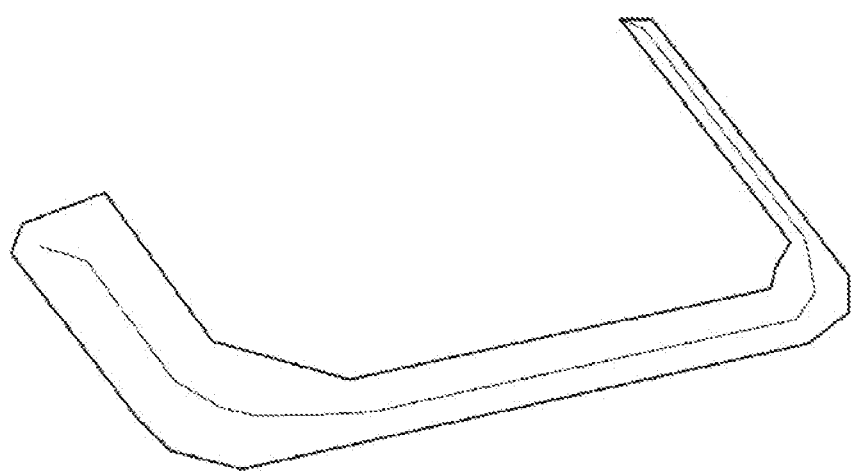
FIG. 9 is a diagram illustrating an example of a result of applying thinning processing.

FIGS. 8 and 9 are diagrams illustrating an example of results of applying the thinning processing.

Lines in an area illustrated in FIG. 8 are results of applying the Zhang-Suen thinning processing to the bitmap illustrated in FIG. 6. Lines in an area illustrated in FIG. 9 are results of applying the Zhang-Suen thinning processing to the bitmap illustrated in FIG. 7.

Segmentation of Thinned Image
Then, for vectorization that is post-processing, the segmentation unit 103 performs segmentation processing on a thinned image (S3). The segmentation is processing in which the centerline in the thinned image is divided in a longitudinal direction on the basis of end points and branch points of the centerline such that a plurality of lines are generated.

Figure 10:
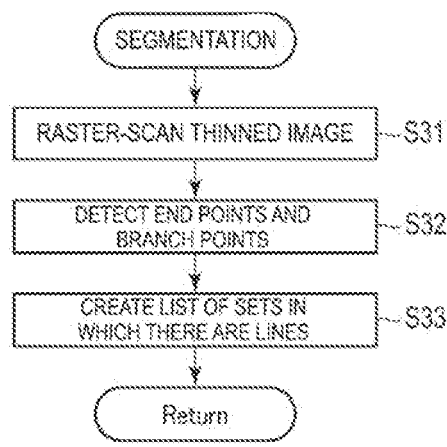
FIG. 10 is a flowchart illustrating an example of a procedure for segmentation processing in a sidewalk centerline generation device according to an embodiment of the present invention.

A specific example of the segmentation processing will be described in S31 to S33 below. FIG. 10 is a flowchart illustrating an example of a procedure for segmentation processing in the sidewalk centerline generation device according to an embodiment of the present invention.

First, the segmentation unit 103 sets a value of a pixel of a background in the thinned image to "0" and sets a value of a pixel in a portion in which the centerline is drawn in the thinned image to "1".

Figure 11:
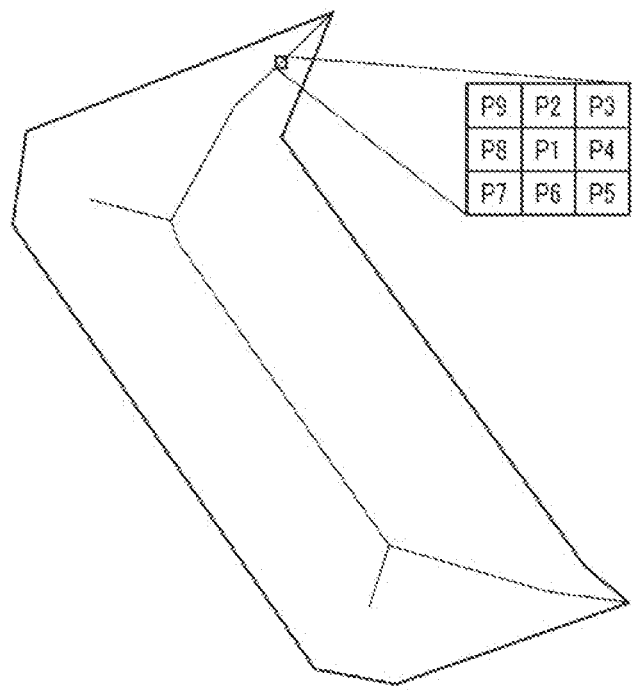
FIG. 11 is a diagram illustrating an example of numbering of pixels in a thinned image.

FIG. 11 is a diagram illustrating an example of numbering of pixels in a thinned image. The segmentation unit 103 raster-scans the thinned image (S31) and sets the pixel of interest as P1. When a value of P1 is "1," the segmentation unit 103 numbers eight pixels adjacent to P1 as P2 to P9, as in FIG. 11. The segmentation unit 103 counts the number A of pixels having a value of "1" among the pixels of P2 to P9. When the result is A=1, the segmentation unit 103 sets a pixel P1 as an end point.

Further, when the result is not A=1, the segmentation unit 103 checks the values of the numbered pixels in an order of P2, P3, P4, P5 P6 P7, P8, P9, and P2. The segmentation unit 103 generates an arrangement having a total of nine checked values, counts the number of places B having a value of "1" after "0" in this arrangement, and the segmentation unit 103 sets the pixel P1 as a branch point when B≥3 (S32).

After all of the end points and the branch points have been found, the segmentation unit 103 searches for a set in which a line is present between these points through contour tracking, and creates a list of sets of two points (S33). Hereinafter, a line connected by a set of two points is referred to as a segment.

Figure 12:
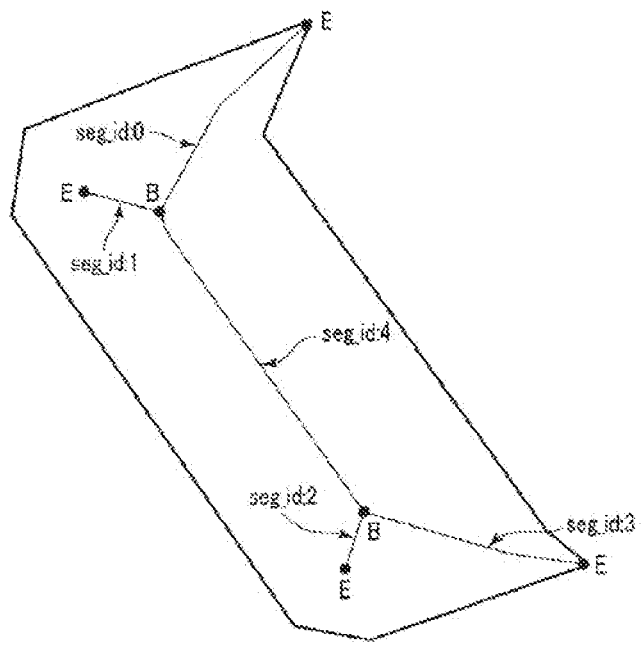
FIG. 12 is a diagram illustrating an example of results of the segmentation processing.
Figure 13:
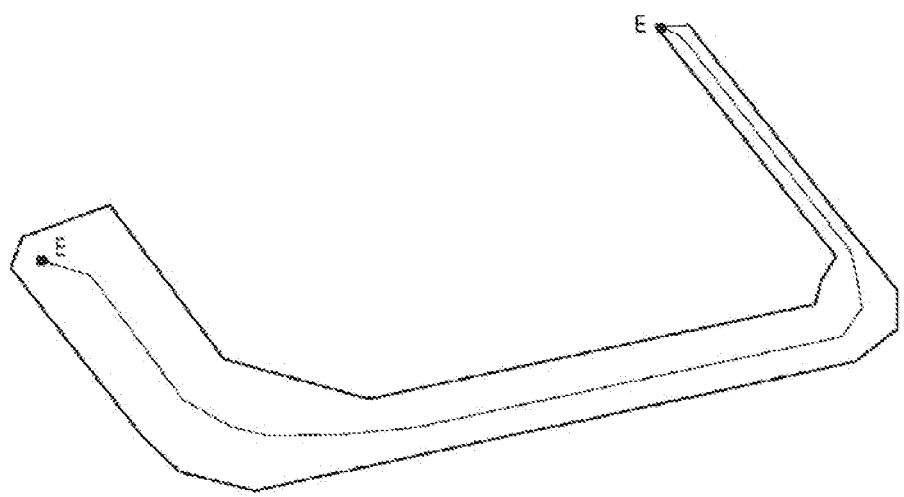
FIG. 13 is a diagram illustrating an example of results of the segmentation processing.

FIGS. 12 and 13 are diagrams illustrating an example of results of the segmentation processing. FIG. 12 illustrates a result of applying the segmentation processing to a thinning processing result illustrated in FIG. 8. FIG. 13 illustrates a result of applying the segmentation processing to a thinning processing result illustrated in FIG. 9. In FIGS. 12 and 13, points marked with E indicate detected end points and points marked with B indicate detected branch points.

For example, in FIG. 12, there are five segments respectively corresponding to seg_id: 0 to seg_id: 4, the respective segments corresponding to seg_id: 0, seg_id: 1, and seg_id: 4 extend from the first branch point, and respective segments corresponding to seg_id: 2, seg_id: 3, and seg_id: 4 extend from the second branch point. In FIG. 13, one segment is illustrated. In a stage in which the processing of the segmentation unit has been completed, a line between two points remains as a bitmap.

Vectorization of Segment, and Longitude and Latitude Conversion

The vectorization unit 104 performs vectorization processing on a list of sets of the two points (S4). The vectorization is also referred to as conversion to vector data. Vectorization processing is processing in which each of the lines as a plurality of bitmaps shown in the segmentation processing is converted to sidewalk vector data, which is a coordinate sequence. Specifically, for example, a two-division method described in page 194 of a literature "Computer Graphic Arts Society, Digital Image Processing [New revised version], ISBN-10: 490347450X" is used.

Figure 14:
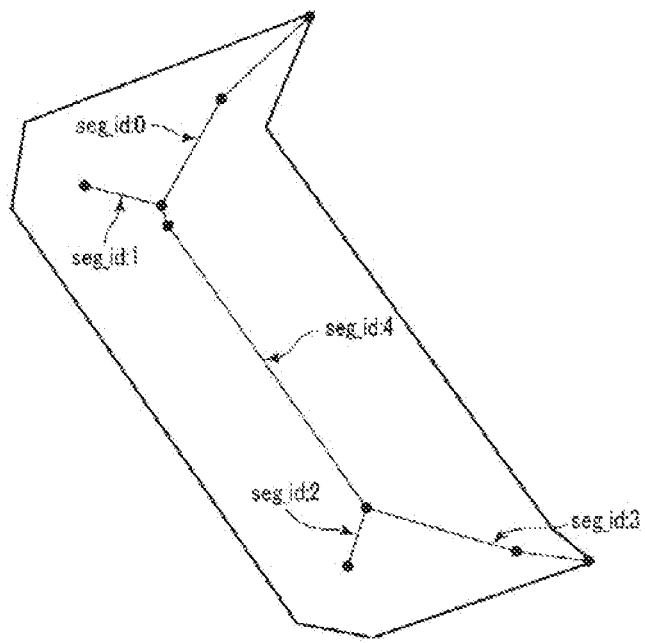
FIG. 14 is a diagram illustrating an example of results of vectorization processing.
Figure 15:
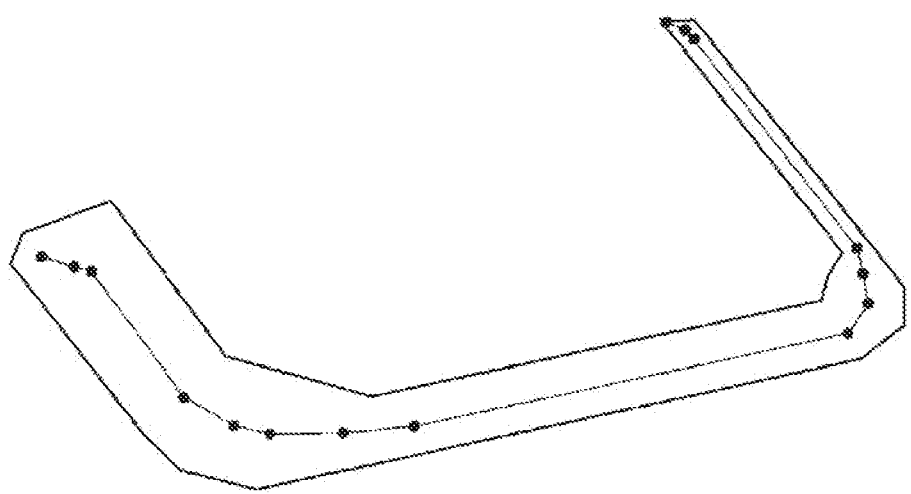
FIG. 15 is a diagram illustrating an example of results of the vectorization processing.

FIGS. 14 and 15 are diagrams illustrating an example of results of the vectorization processing. FIG. 14 illustrates results of applying the vectorization processing to the segmentation processing results illustrated in FIG. 12. FIG. 15 illustrates a result of applying the vectorization processing to the segmentation processing results illustrated in FIG. 13. Black points forming a plurality of line segments in FIGS. 14 and 15 are coordinates obtained through the vectorization processing.

As a result of the vectorization processing, the respective segments corresponding to seg_id: 0, seg_id: 3, and seg_id: 4 illustrated in FIG. 12 are segments in which two line segments are connected via points as illustrated in FIG. 14, and the number of points constituting these segments is three. The other segments are segments including one line segment, and the number of points constituting these segments is two.

The vectorized point is coordinates on the bitmap. Here, the latitude and longitude conversion unit 105 converts the coordinates to a latitude and a longitude (S5).

Width Calculation

In S1 to S5, the sidewalk centerline generation device 10 converts the sidewalk polygon data to the bitmap in consideration of a ratio of amounts corresponding to one degree of the latitude and longitude, obtains the sidewalk centerline through thinning processing, and performs conversion to vector data and latitude and longitude conversion.

Then, the width calculation unit 108 performs width calculation processing for obtaining the width of the sidewalk (S6). Here, the width calculation unit 108 calculates the width of the sidewalk on the basis of a distance between a predetermined position indicated by the coordinate sequence of the line segment indicated by the vector data and a boundary of the area of the sidewalk.

Figure 16:
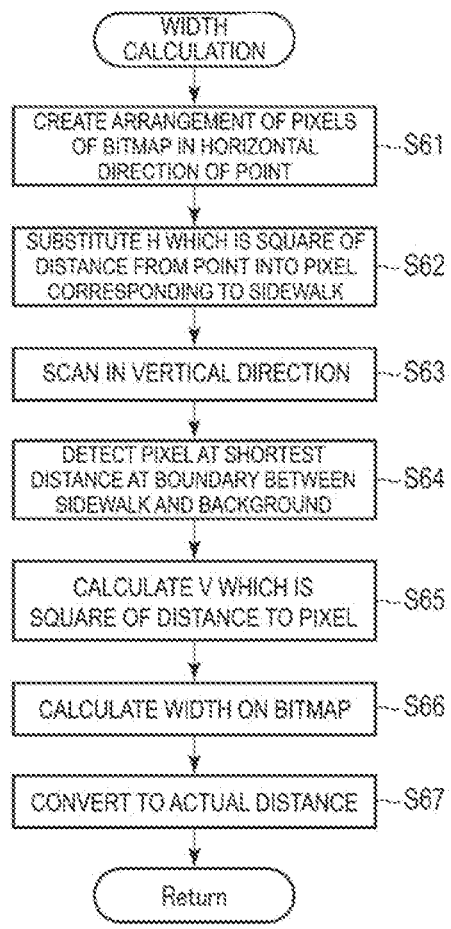
FIG. 16 is a flowchart illustrating an example of a procedure of width calculation processing in the sidewalk centerline generation device according to the embodiment of the present invention.

A specific example of the width calculation processing will be described in S61 to S67 below. FIG. 16 is a flowchart illustrating an example of a procedure of the width calculation processing in the sidewalk centerline generation device according to an embodiment of the present invention. First, the width calculation unit 108 creates an arrangement of pixels of the bitmap in a horizontal direction of the point with respect to one predetermined point indicated by the coordinate sequence forming the vector data, which is the vectorized data (S61).

The width calculation unit 108 calculates H which is a square of a distance from the point to each pixel and substitutes H as a value of an element (pixel) corresponding to the sidewalk into the value of the pixel even when the sidewalk is drawn in the corresponding pixels in this arrangement (S62).

Figure 17:
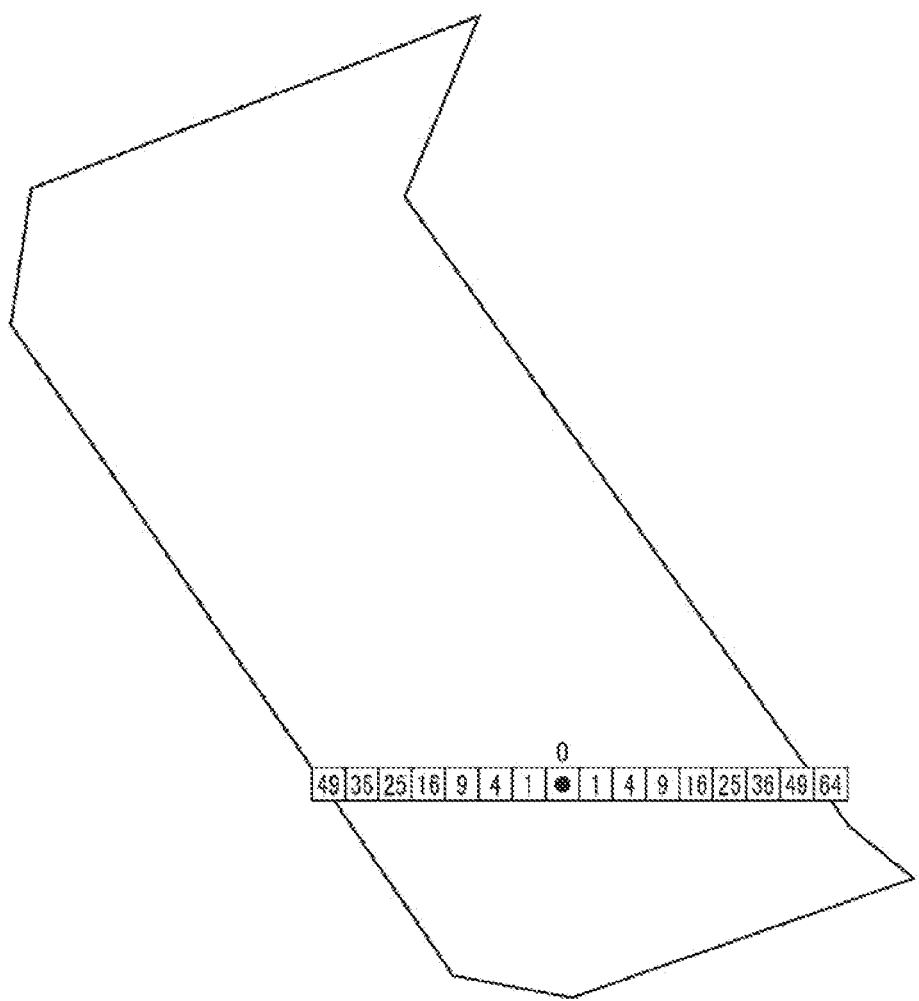
FIG. 17 is a diagram illustrating an example of results of substituting a square of a distance in the width calculation processing.

FIG. 17 is a diagram illustrating an example of results of substituting the square of the distance in the width calculation processing. Here, in FIG. 17, the number of pixels is omitted and is smaller than an actual number, and elements into which the above H is not substituted are omitted.

Then, the width calculation unit 108 scans the bitmap in a vertical direction from each element into which the numerical value (H) has been substituted in the arrangement created in S61 (S63). The width calculation unit 108 detects a pixel located at the shortest distance between the element in the vertical direction and the boundary of the sidewalk (S64) and calculates V which is a square of the shortest distance (S65). The boundary of the sidewalk means a boundary separating the sidewalk and a background out of the sidewalk.

Then, the width calculation unit 108 selects a minimum value from a result of summing the individual H and V calculated for each element, and calculates twice a square root of this value as a width Wb on the bitmap at a point that is a target (S66).

Figure 18:
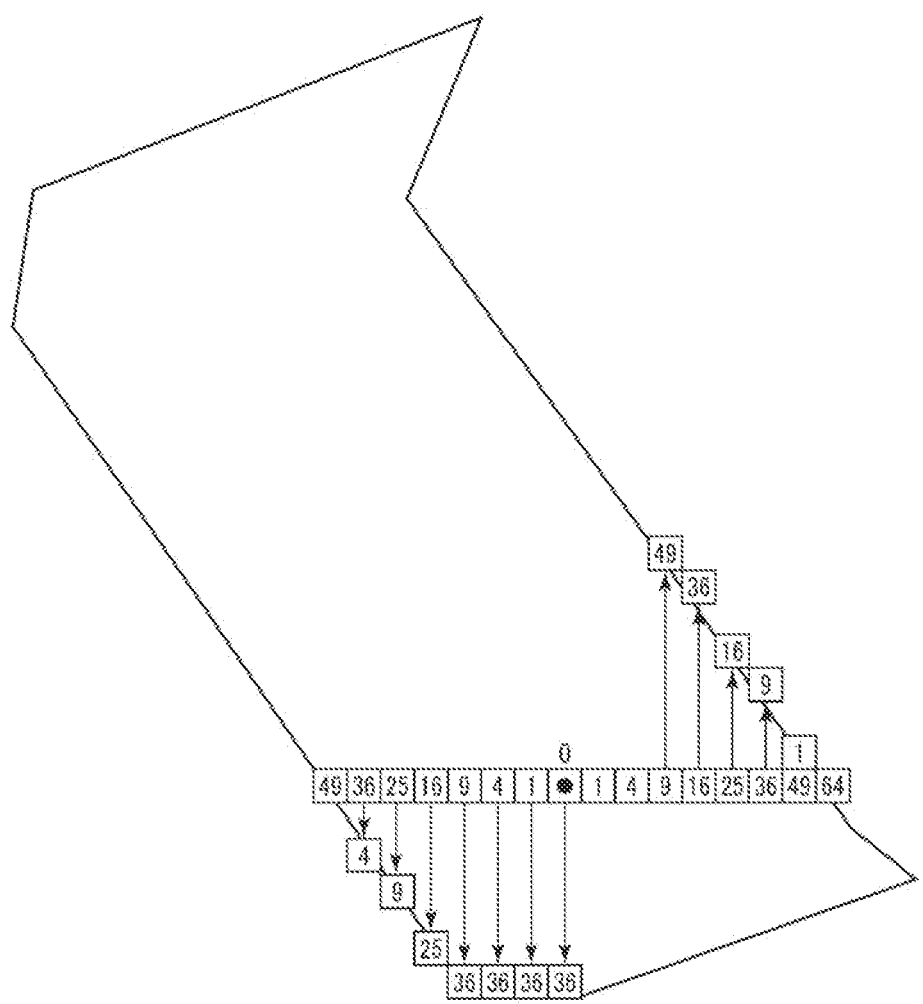
FIG. 18 is a diagram illustrating an example of a detection result of a shortest distance to a boundary of a sidewalk.

FIG. 18 is a diagram illustrating an example of a detection result of the shortest distance up to the boundary of the sidewalk. In the example illustrated in FIG. 18, 34 (=25+9) that is a sum of H and V when (H, V)=(25, 9) is the smallest value in the sum of H and V for the individual elements, and the width calculation unit 108 calculates twice a square root of 34 as the width Wb on the bitmap at the point that is a target.

Then, the width calculation unit 108 converts the width Wb to an actual distance Wr using Equation (3) below (S67).

$$Wr = Wb * mx/10000000 \qquad \text{Equation (3)}$$

From the above results, the following results are output. FIGS. 19 and 20 are diagrams illustrating an example of output data of the width. An example of the output data corresponding to FIGS. 2, 6, 8, 12, 14, 17, and 18 is shown in FIG. 19. Further, an example of the output data corresponding to FIGS. 3, 7, 9, 13, and 15 is shown in FIG. 20. road_id illustrated in FIGS. 19 and 20 is id of a sidewalk in a region that is a processing target. seg_id illustrated in FIGS. 19 and 20 is id of a segment constituting the sidewalk corresponding to road_id in the same row in the output data, that is, a line id in the segmentation processing. point_id illustrated in FIGS. 19 and 20 indicates id of a connection order (0, 1, 2, . . . ) of points (coordinates) on the sidewalk centerline in the sidewalk vector data. latitude and longitude illustrated in FIGS. 19 and 20 are a latitude and a longitude of each point. width illustrated in FIGS. 19 and 20 is a width.

In the example illustrated in FIG. 19, a sidewalk with road_id "8670" has respective segments corresponding to seg_id "0", "1", "2", "3", and "4", and the segment corresponding to seg_id "0" has respective points corresponding to point_id "0" (here, the branch point), "1", and "2" (here, the end point). In the example illustrated in FIG. 19, a latitude, a longitude, and a width of the point corresponding to point_id "0" are "35.6927 . . . ", "139.7024 . . . ", and "685.8085 . . . " at topmost of the output data illustrated in FIG. 19.

The width calculation unit 108 may differentiate slopes of the line segments located before and after each of the points constituting the sidewalk vector data, scan values thereof in a vertical direction, and detect a boundary to obtain the width. However, the sufficiently large number of points are set at the time of vectorization so that it is difficult for a calculation error to occur.

Removal of Unnecessary Segments

Figure 21:
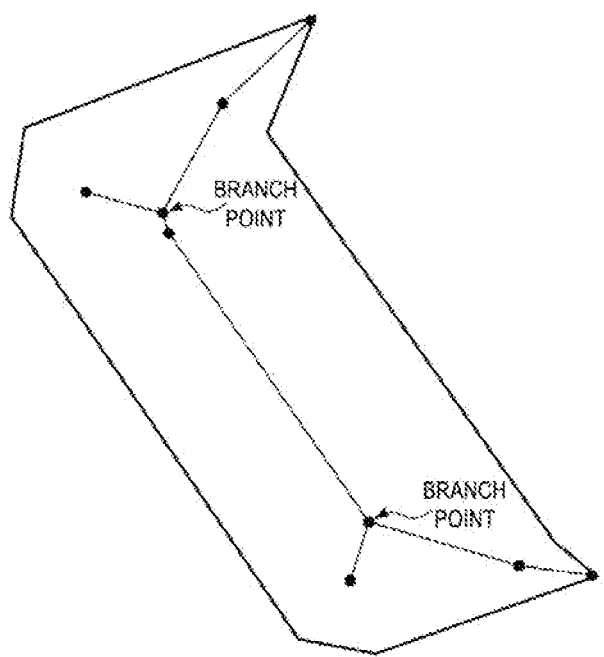
FIG. 21 is a diagram illustrating an example of unnecessary branch points.

It is difficult to obtain an ideal centerline for a sidewalk having a shape having an aspect ratio close to 1:1, such as a rectangular parallelepiped shape, even when any thinning algorithm is used. FIG. 21 is a diagram illustrating an example of unnecessary branch points. FIG. 21 illustrates results showing branch points generated at undesirable places in the vectorization processing results illustrated in FIG. 14.

Thus, the unnecessary segment removal unit 106 performs unnecessary segment removal processing for removing segments corresponding to undesirable places (S7). Here, the unnecessary segment removal unit 106 extracts a plurality of line segments extending from branch points at the same coordinates among the line segments indicated as the coordinate sequence of the latitude and longitude by the vector data, which are line segments having one side as the branch point and the other side as an end point. The unnecessary segment removal unit 106 leaves one of the extracted line segments and then deletes the other line segments having a length smaller than a predetermined length among the extracted line segments.

Figure 22:
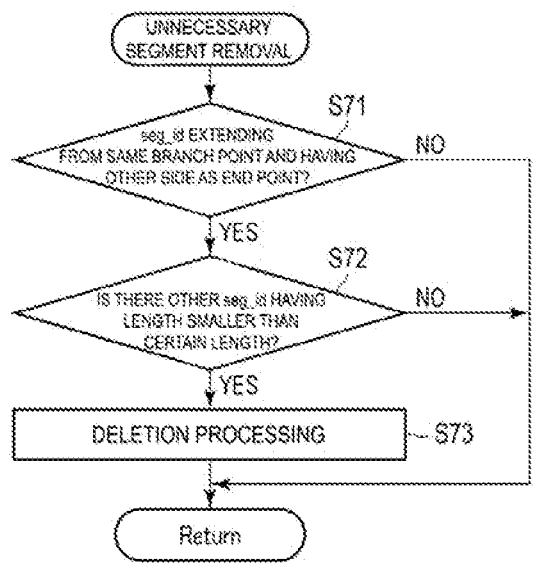
FIG. 22 is a flowchart illustrating an example of a procedure of unnecessary segment removal processing in the sidewalk centerline generation device according to the embodiment of the present invention.

A specific example of the unnecessary segment removal processing will be described in S71 to S73 below. FIG. 22 is a diagram illustrating an example of a procedure for bitmap generation processing in the sidewalk centerline generation device according to an embodiment of the present invention.

The unnecessary segment removal unit 106 refers to the output data illustrated in FIG. 19 or 20, and when rows relevant to seg_id corresponding to the plurality of respective line segments extending from the same branch point, such as seg_id: 0 and seg_id: 1 illustrated in FIG. 19 and seg_id: 2 and seg_id: 3 illustrated in FIG. 19 are present in respective rows relevant to a certain road_id in the output data, line segments thereof are line segments having one side as a branch point and the other side as an end point (YES in S71), and there are line segments having a length smaller than a certain length (for example, 3 m) among these line segments (YES in S72), the unnecessary segment removal unit 106 leaves one of the line segments having one side as a branch point and the other side as an end point and then performs processing of correcting the output data so that other line segments having a length smaller than the certain length are deleted (S73).

For whether the rows corresponding to seg_id corresponding to the plurality of respective line segments extending from the same branch point are present in each row relevant to the certain road_id in the output data referred to in the processing of S71, the unnecessary segment removal unit 106, for example, may extract rows relevant to first or last point_id among respective point_id relevant to the same road_id and the same seg_id in the output data and check whether a plurality of rows corresponding to the same latitude and longitude are present in these rows.

Further, in the processing of S71, for whether each of the line segments extending from the same branch point is the line segment having one side as a branch point and the other side as an end point, the unnecessary segment removal unit 106 may confirm whether the point corresponding to the same latitude and longitude as the latitude and longitude of the other point is not included in the respective points relevant to the same road_id in the output data.

Further, in the processing of S72, for example, the unnecessary segment removal unit 106 may obtain a length between points of the line segment having two points using a Hubeny formula, or the like. Further, the unnecessary segment removal unit 106 may obtain a length between points of each line segment having three or more points, and then, obtain a total length by summing these lengths.

Figure 23:
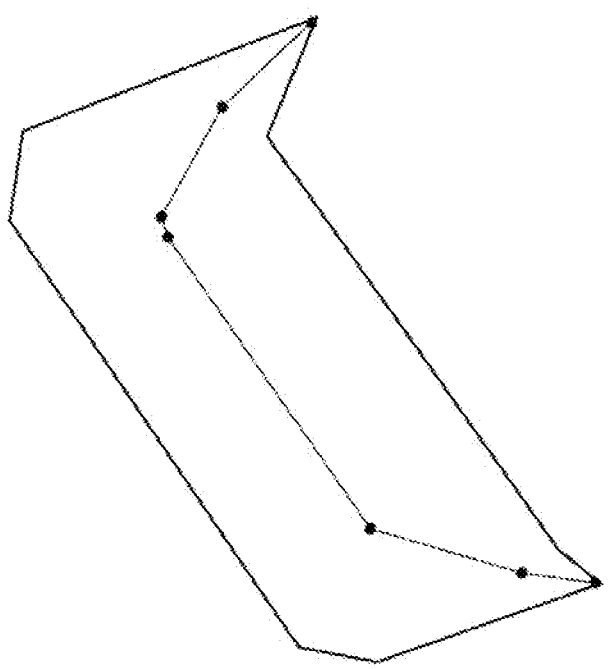
FIG. 23 is a diagram illustrating an example of a result of the unnecessary segment removal processing.

FIG. 23 is a diagram illustrating an example of a result of the unnecessary segment removal processing. As shown in the example illustrated in FIG. 23, line segments having a length equal to or smaller than a certain length among the plurality of line segments extending from the branch point illustrated in FIG. 21, such as the line segments corresponding to seg_id: 1 and seg_id: 2 illustrated in FIG. 19, have been deleted.

Further, after the deletion, the unnecessary segment removal unit 106 confirms the latitude and longitude in each row relevant to the road_id to confirm whether an intersection or a branch point is not included in the line segments after deletion, such as the line segments corresponding to seg_id: 0, seg_id: 3, and seg_id: 4 illustrated in FIG. 19. When the intersection or the branch point is not included, the unnecessary segment removal unit 106 corrects the output data so that seg_id corresponding to the respective line segments are collected into one seg_id.

Correction of Warpage of Vector Data

In general, the end of the sidewalk is a so-called involvement portion having R (curve radius). Thus, the vector data of the sidewalk centerline is in a curved shape as the vector data approaches the end of the sidewalk. Thus, the warpage correction unit 107 performs warpage correction processing for shaping the curved shape (S8).

Figure 24:
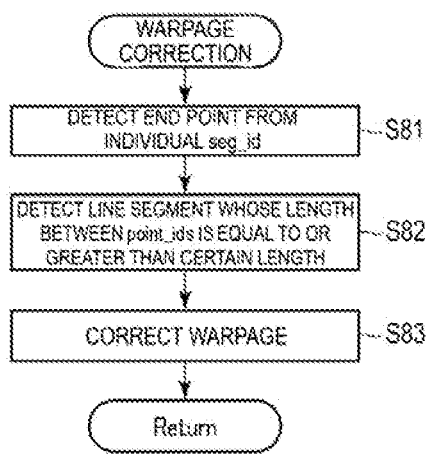
FIG. 24 is a flowchart illustrating an example of a procedure of warpage correction processing in the sidewalk centerline generation device according to the embodiment of the present invention.

A specific example of the warpage correction processing will be described in S81 to S83 below. FIG. 24 is a diagram illustrating an example of a procedure of the warpage correction processing in the sidewalk centerline generation device according to an embodiment of the present invention.

The warpage correction unit 107 confirms whether line segments corresponding to individual seg_id in rows relevant to the individual road_id in the output data after the unnecessary segment deletion have an end point (S81). For whether the line segments have the end point, the warpage correction unit 107 may confirm that the same latitude and longitude as the latitude and longitude shown in the row relevant to first or last point_id among the respective rows relevant to the same seg_id are not present in each row relevant to the same road_id.

Figure 25:
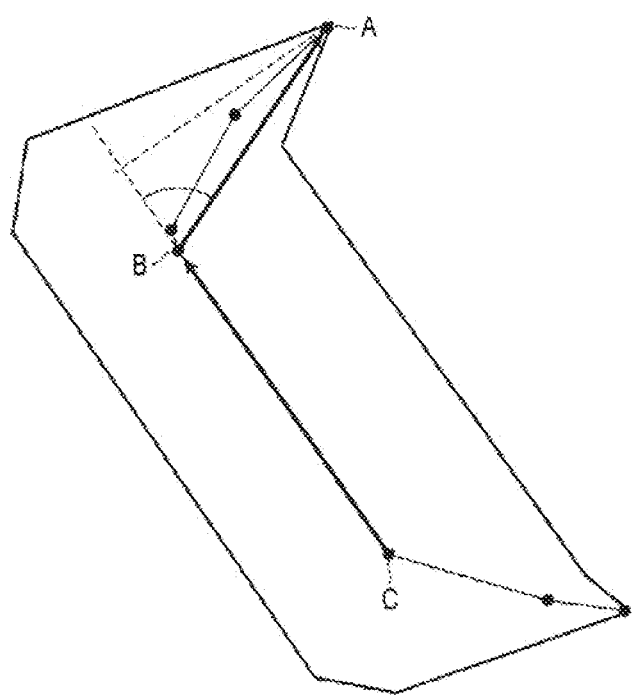
FIG. 25 is a diagram illustrating an example of the warpage correction processing.

FIG. 25 is a diagram illustrating an example of the warpage correction processing. When the line segment has an end point, this end point is set as an end point A illustrated in FIG. 25, and when point_id of the end point A is first point_id among respective point_id corresponding to the same seg_id, the warpage correction unit 107 follows this point_id in an end direction in the respective point_id, and searches for, as a reference line segment, a line segment in which a length between respective points corresponding to first point_id and point_id corresponding to the end side from the first point_id is equal to or greater than a certain length, such as 5 m (S82).

When this portion having a length equal to or greater than the certain length is a vector BC illustrated in FIG. 25, the warpage correction unit 107 obtains cos θ between a vector CB and a vector BA, extends the B side of the vector CB by a length of cos θ|BA|, and deletes all of point_id corresponding to points just before the point B.

Further, when point_id of the end point A is last point_id among respective point_id relevant to the same seg_id, the warpage correction unit 107 follows a reverse direction of an end direction in the above point_id and performs the same processing as when following the end direction. That is, the warpage correction unit 107 converts the line segment having the warpage to a line segment that is a reference and a line segment linearly connected to the line segment to correct the warpage (S83).

Figure 26:
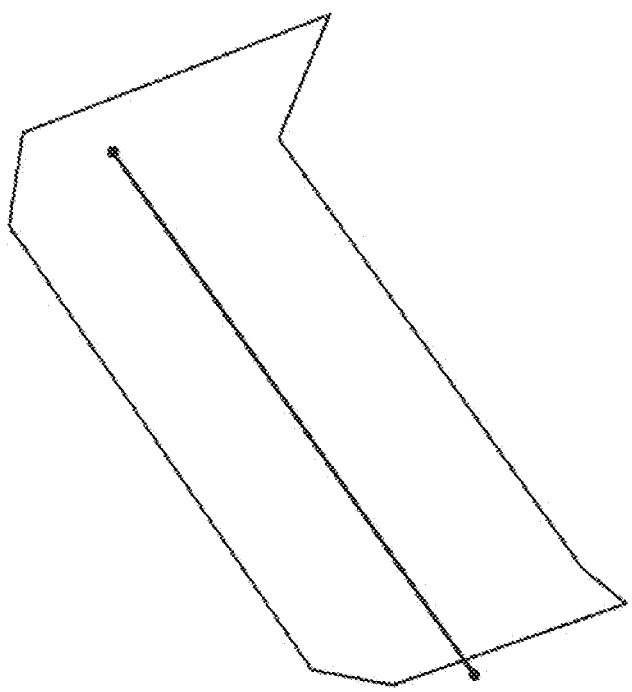
FIG. 26 is a diagram illustrating an example of a result of the warpage correction processing.

As a result of the above processing, sidewalk vector data in which warpage has been corrected is generated. FIG. 26 is a diagram illustrating an example of a result of the warpage correction processing. FIG. 27 is a diagram illustrating an example of output data after the warpage correction processing. An example in which a result of correcting the warpage, which is illustrated in FIG. 25, is visualized is illustrated in FIG. 26. Through the warpage correction processing, numerical data illustrated in FIG. 19 is converted to numerical data illustrated in FIG. 27 through the unnecessary segment removal processing and the warpage correction processing. In FIG. 27, an item "latlon_id" is an item in which latitude and longitude are written side by side.

Figure 28:
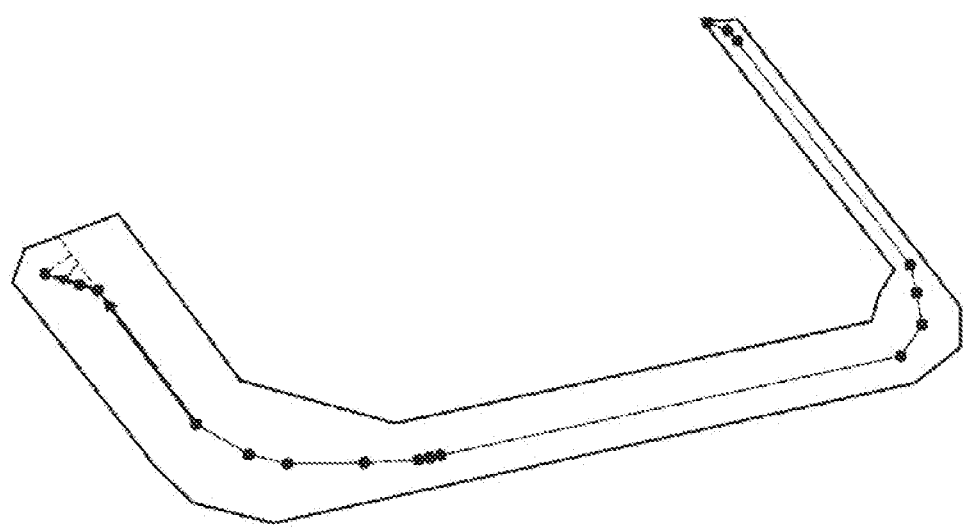
FIG. 28 is a diagram illustrating an example of the warpage correction processing.
Figure 29:
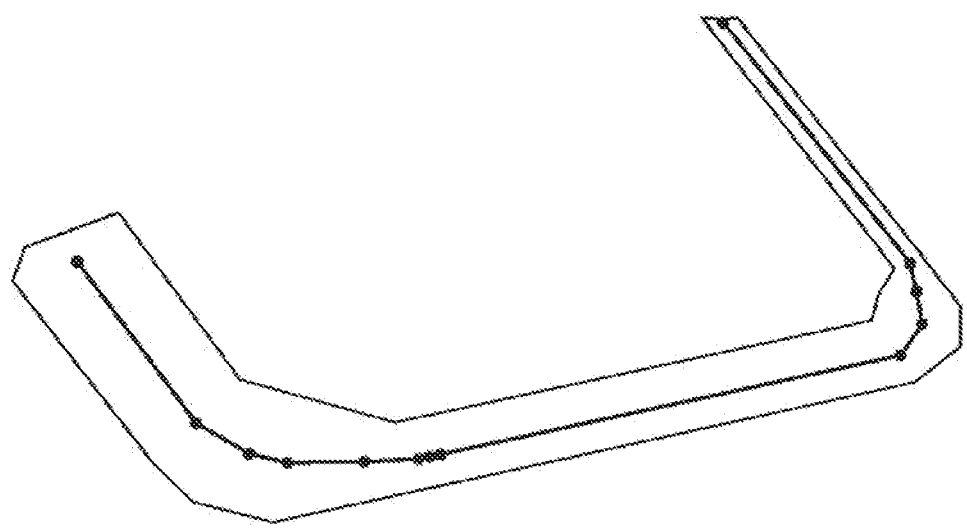
FIG. 29 is a diagram illustrating an example of a result of the warpage correction processing.

FIG. 28 is a diagram illustrating an example of warpage correction processing. FIG. 29 is a diagram illustrating an example of a result of the warpage correction processing. FIG. 30 is a diagram illustrating an example of output data after the warpage correction processing. An example in which a result of correcting warpage illustrated in FIG. 28 is visualized is FIG. 29. Through the warpage correction processing, numerical data illustrated in FIG. 20 is converted to numerical data illustrated in FIG. 30 through the unnecessary segment removal processing and the warpage correction processing. Final output data is stored in the sidewalk-with-width centerline data storage unit 109.

Figure 31:
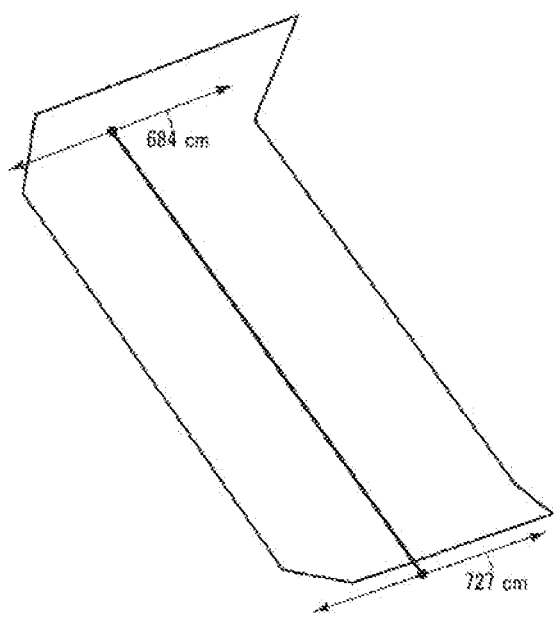
FIG. 31 is a diagram illustrating an example in which a width of the sidewalk is visualized.
Figure 32:
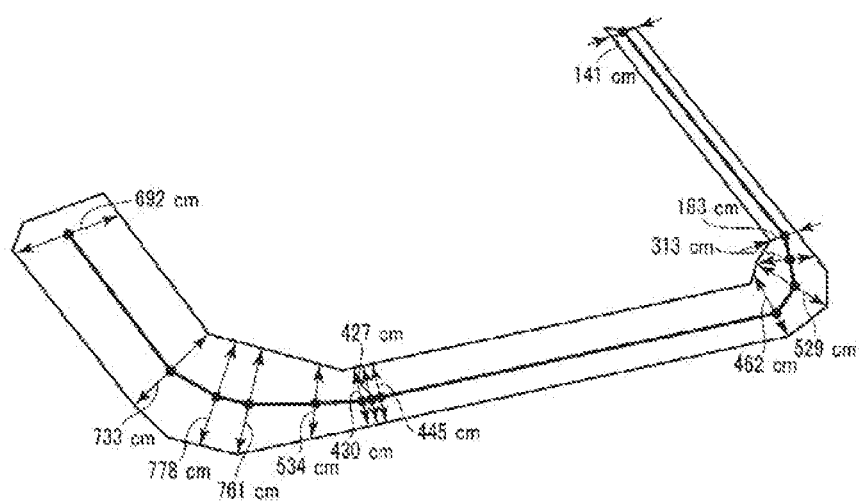
FIG. 32 is a diagram illustrating an example in which a width of the sidewalk is visualized.

FIGS. 31 and 32 are diagrams illustrating an example in which the width of the sidewalk is visualized. An example in which the width of the sidewalk is visualized for warpage correction results illustrated in FIG. 26 is FIG. 31. An example in which the width of the sidewalk is visualized for warpage correction results illustrated in FIG. 29 is FIG. 32. When the width is visualized in this way, this is effective for a wheelchair user or the like to determine whether the wheelchair user or the like can pass through the sidewalk.

Figure 33:
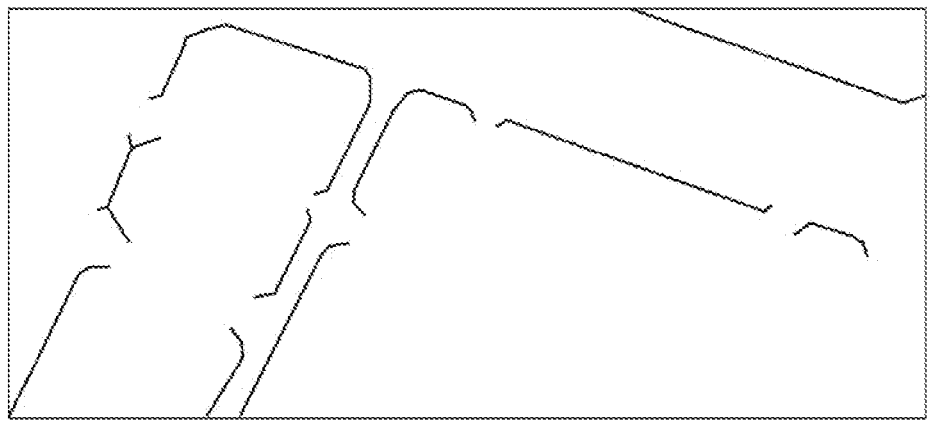
FIG. 33 is a diagram illustrating an example of an output when the unnecessary segment removal processing and the warpage correction processing are not performed.
Figure 34:
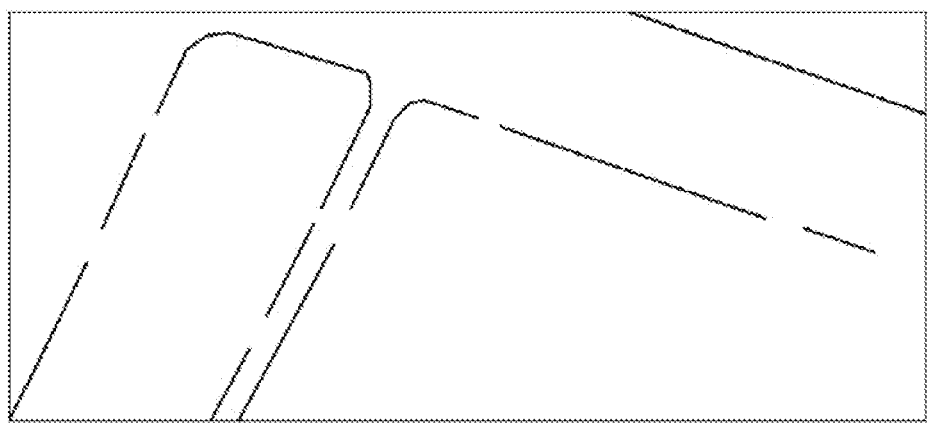
FIG. 34 is a diagram illustrating an example of an output when the unnecessary segment removal processing and the warpage correction processing have been performed.

FIG. 33 is a diagram illustrating an example of an output when the unnecessary segment removal processing and the warpage correction processing have not been performed. In FIG. 33, an example of an output when both the unnecessary segment removal processing and the warpage correction processing have not been performed on a plurality of adjacent sidewalk centerlines is illustrated. On the other hand, FIG. 34 is a diagram illustrating an example of an output when the unnecessary segment removal processing and the warpage correction processing have been performed.

As described above, the sidewalk centerline generation device according to the embodiment of the present invention may automatically perform vectorization of the sidewalk centerline data for creating the sidewalk network information through the segmentation processing and the vectorization processing. Thus, it is possible to appropriately generate the sidewalk information necessary for a road guidance system for wheelchair users or the like. Further, it is possible to generate a sidewalk centerline having an appropriate shape that can be used to smoothly perform correct road guidance for wheelchair users or the like by correcting unnecessary branches and extra warpage of the sidewalk centerline on the basis of the vectorized data.

The present invention is not limited to the embodiments, and various modifications can be made without departing from the gist of the present invention in an implementing stage. Furthermore, the embodiments may be implemented in combination appropriately as long as it is possible, and in this case, combined effects can be obtained. Further, the above embodiments include inventions on various stages, and various inventions may be extracted by appropriate combinations of the disclosed multiple configuration requirements.

Further, a scheme described in each embodiment can be stored in a recording medium such as a magnetic disk (a Floppy (trade name) disk, a hard disk, or the like), an optical disc (a CD-ROM, a DVD, an MO, or the like), a semiconductor memory (a ROM, a RAM, a flash memory, or the like) or transferred by a communication medium for distribution, as a program (a software unit) that can be executed by a computing machine (a computer). Note that the program stored on the medium side includes a setting program for configuring, in a computing device, a software means (including not only an execution program but also a table and a data structure) to be executed by the computing device. The computing device which implements the present information processing device reads the program recorded in the recording medium, optionally builds the software means by the setting program, and executes the above-described processing by controlling the operation with the software means. Note that the recording medium referred to herein is not limited to a recording medium for distribution, but includes a storage medium such as a magnetic disk or a semiconductor memory provided in a computing machine or a device connected via a network.

REFERENCE SIGNS LIST

10 Sidewalk centerline generation device
100 Sidewalk polygon data storage unit
101 Bitmap generation unit
102 Thinning unit
103 Segmentation unit
104 Vectorization unit
105 Latitude and longitude conversion unit
106 Unnecessary segment removal unit
107 Warpage correction unit
108 Width calculation unit
109 Sidewalk-with-width centerline data storage unit

The invention claimed is:

1. A sidewalk information generation device comprising:
a processor; and
a storage medium having computer program instructions stored thereon, when executed by the processor, cause the processor to
  perform thinning processing for extracting, from image data indicating an area of a sidewalk, a centerline in a width direction of the area of the sidewalk;
  perform segmentation processing for dividing the centerline extracted by the thinning unit in a longitudinal direction to generate a plurality of lines; and
  convert each of the plurality of lines generated by the segmentation unit to vector data indicating a coordinate sequence of a plurality of line segments;
  wherein the computer program instructions further cause the processor to extract the plurality of line segments extending from a branch point of coordinate, each of the plurality of line segments having one end as the branch point, from among the plurality of line segments indicated as the coordinate sequence by the vector data, leave one of the plurality of line segments that is extracted, and then delete some of the plurality of line segments, each of which is different from the one of the plurality of line segments and has a length smaller than a predetermined length among the plurality of line segments that are extracted.

2. The sidewalk information generation device according to claim 1, wherein the computer program instructions further cause the processor to calculate a width of the sidewalk based on a distance between a predetermined position indicated by the coordinate sequence of the plurality of line segments indicated by the vector data and a boundary of the area of the sidewalk.

3. The sidewalk information generation device according to claim 2, wherein the computer program instructions further cause the processor to convert a line segment having warpage indicated by the vector data to a line segment serving as a reference and a line segment linearly connected to the line segment serving as the reference to correct the warpage.

4. The sidewalk information generation device according to claim 2, wherein the computer program instructions further cause the processor to convert a line segment having warpage indicated by the vector data to a line segment serving as a reference and a line segment linearly connected to the line segment serving as the reference to correct the warpage.

5. The sidewalk information generation device according to claim 1, wherein the computer program instructions further cause the processor to convert a line segment having warpage indicated by the vector data to a line segment serving as a reference and a line segment linearly connected to the line segment serving as the reference to correct the warpage.

6. The sidewalk information generation device according to claim 1, wherein the computer program instructions further cause the processor to convert a line segment having warpage indicated by the vector data to a line segment serving as a reference and a line segment linearly connected to the line segment serving as the reference to correct the warpage.

7. A sidewalk information generation method performed by a sidewalk information generation device, the sidewalk information generation method comprising:
  performing thinning processing for extracting, from image data indicating an area of a sidewalk, a centerline in a width direction of the area of the sidewalk;
  performing segmentation processing for dividing the centerline that is extracted in a longitudinal direction to generate a plurality of lines; and
  converting each of the plurality of lines that is generated to vector data indicating a coordinate sequence of a plurality of line segments, wherein the extraction of the plurality of line segments extending from a branch point of coordinate includes each of the plurality of line segments having one end as the branch point, from among the plurality of line segments indicated as the coordinate sequence by the vector data, leave one of the plurality of line segments that is extracted, and then delete some of the plurality of line segments, each of which is different from the one of the plurality of line segments and has a length smaller than a predetermined length among the plurality of line segments that are extracted.

8. The method of claim 7 further comprises calculating a width of the sidewalk based on a distance between a predetermined position indicated by the coordinate sequence of the plurality of line segments indicated by the vector data and a boundary of the area of the sidewalk.

9. The method of claim 8 further comprises converting a line segment having warpage indicated by the vector data to a line segment serving as a reference and a line segment linearly connected to the line segment serving as the reference to correct the warpage.

10. The method of claim 7 further comprises converting a line segment having warpage indicated by the vector data to a line segment serving as a reference and a line segment linearly connected to the line segment serving as the reference to correct the warpage.

* * * * *